United States Patent Office 3,595,726
Patented July 27, 1971

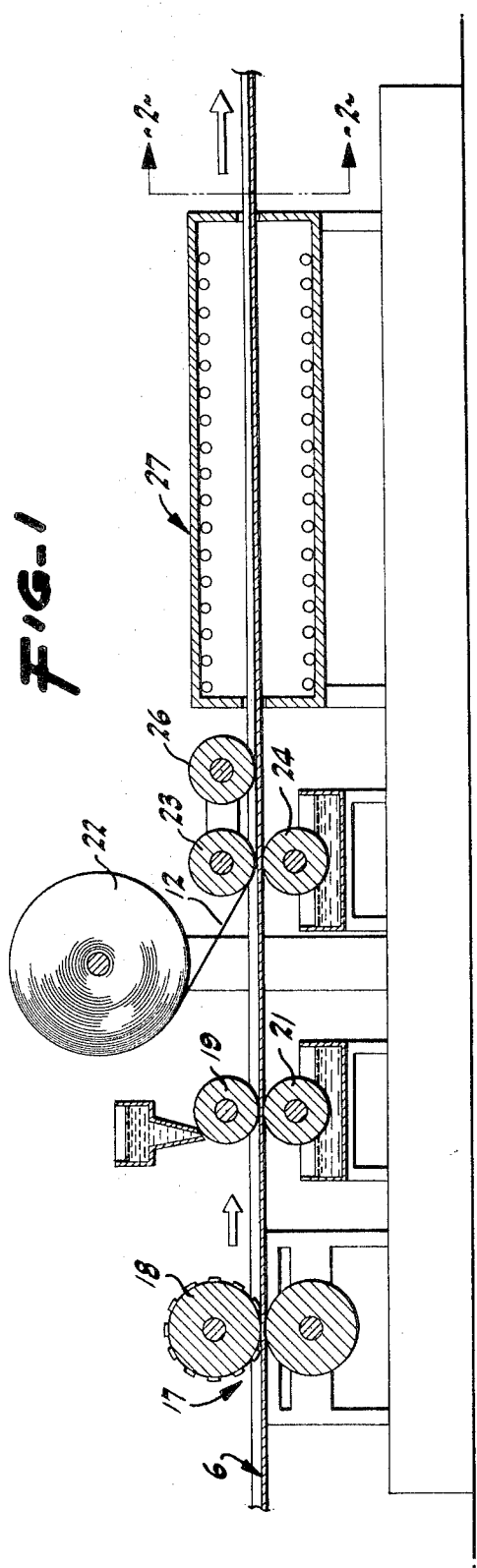
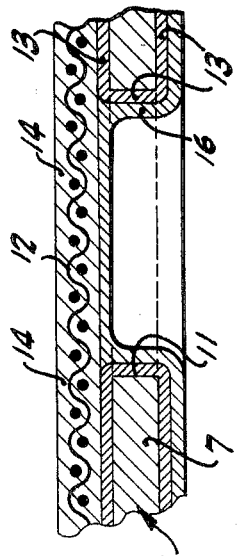
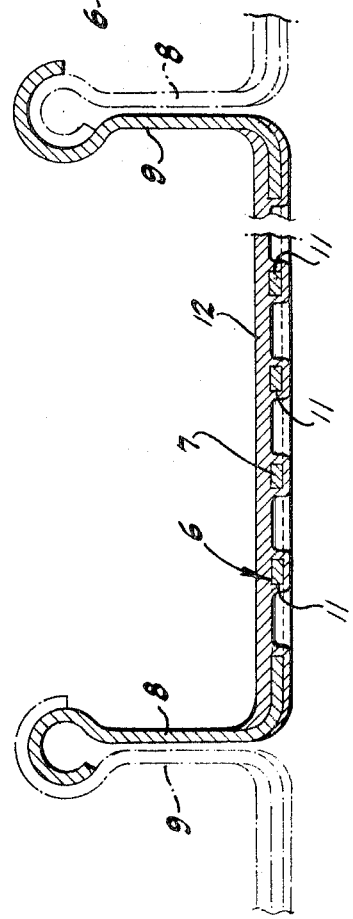

3,595,726
ROOF LIGHT PANEL
Arthur H. Middleton, 160 Grand View Ave.,
San Francisco, Calif. 94114
Filed Aug. 21, 1969, Ser. No. 851,834
Int. Cl. E04c 1/42, 2/54; E04h 5/62
U.S. Cl. 161—3.5                                      5 Claims

ABSTRACT OF THE DISCLOSURE

A roof light panel is made up of a trough-like aluminum sheet having upstanding longitudinal edges adapted to interlock with similar adjacent sheets. The bottom of the panel is perforated. A sheet of translucent fiber glass reinforcing material overlies the perforations. A normally hard, translucent, sealing material envelops the reinforcing material and seals the reinforcing material to the metal sheet. The sealing material also interengages the margins of the perforations.

---

In the construction of some buildings it has become customary to cover the roof structure by a number of elongated panels usually of metal, such as aluminum. The panels have upstanding longitudinal edges, each of which is adapted to be interlocked with a comparable edge on a neighboring panel. Roofing of this sort is satisfactory for most purposes but has a drawback in that it does not itself admit any roof light and does not readily lend itself to the construction of skylights in an economical fashion. In some buildings the metal panels are from place to place omitted and replaced with somewhat similarly constructed panels of a translucent material, such as glass, fiber glass or the like. The difficulty then arises that joints or margins of the metal panels and the glass-carrying or comparable panels are not readily sealed and leaks can develop. There is also considerable difference at the glass-containing panels in the structural strength of the roof. There are other difficulties attendant upon the intermixture of different materials of construction so that it is an object of my invention to provide an improved roof panel which can be used uniformly over a roof yet will admit light.

Another object of the invention is to provide a roof light panel which can be readily interchanged with panels now in use as to fabrication and utility.

A further object of the invention is to provide a roof light panel which is unaffected by variations in temperature and can withstand substantially the same stresses as the present roof panels can stand with the added advantage of admitting light.

A further object of the invention is to provide a roof light panel which can readily be fabricated at the job site so that its cost is relatively low and its dimensions can be carefully held.

Another object of the invention is to provide a roof light panel which is capable of admitting light yet is quite flexible and is not easily damaged or destroyed.

A further object of the invention is to provide a roof light panel of a composite structure in which the components are well secured together and which is not of excessive weight.

Other objects of the invention, together with the foregoing, are described in the accompanying description and set forth in the accompanying drawings in which:

FIG. 1 is a diagram in cross section on a vertical longitudinal plane showing an arrangement for fabricating a roof light panel according to the invention;

FIG. 2 is a cross section on a vertical transverse plane, indicated by the line 2—2 of FIG. 1 and with constructional details omitted, through a roof light panel made according to the invention; and FIG. 3 is an enlarged diagrammatic cross section of a part of FIG. 2.

In its preferred form, the roof light panel of the invention includes as a basic member, a sheet 6. This originally is a planar sheet or long strip (say 100 feet) of rectangular outline conveniently of aluminum but readily fabricated of other materials, as well. The aluminum sheet presently is popular and is well known. The sheet 6 is preferably shaped to include not only a generally planar, central section 7 but along its two longitudinal edges to have upstanding side portions 8 and 9. These are particularly configured to interengage with similar configurations on immediately adjacent panels so that the joints between successive panels are interfolded to keep out the weather. Usually a mechanism is utilized after the panels are in place on the roof to interengage the overlapped portions quite tightly.

The sheet 6 in its present form is preferably provided, at least in the planar, central section 7, with a number of apertures or perforations 11. These are conveniently circular or other shaped holes extending entirely through the sheet and are arranged in any regular or random pattern. For example, they may be diamonds or squares or free form figures and are so sized as to leave substantial mechanical strength in the remaining sheet yet to remove much of the opaque area thereof in order to pass light from one side thereof to the other. It is true that the perforations do, in a measure, weaken the sheet mechanically. To act as a reinforcement in order to restore the strength of the sheet and in order to have a weather proof construction, I preferably provide in the U-shaped trough defined by the sides 8 and 9 and the bottom 7 a superposed layer 12 of translucent material, for example, fiber glass. The glass fibers can be utilized in a felted or matted form, or they can be regularly woven, preferably with substantial interstices so that light is not only passed through the glass fibers themselves but can also filter through the interstices.

Rather than have a fiber glass layer 12 in immediate contact with the aluminum sheet 6, I preferably envelop or enclose the important areas of the aluminum sheet with a translucent bonding or sealing material represented by the exaggerated coat 13 in FIG. 3. The bonding or sealing material coat 13 is conveniently of a material which is plastic or fluid at elevated temperatures or prior to chemical curing but which at normal temperatures or after chemical curing is a solid. The bonding or sealing material coat 13 is also one that is capable of wetting the aluminum sheet so that the metal is surfaced with a material, such as a thermo-plastic resin, which forms a covering or envelope.

In accordance with the invention some of the sealing or bonding resin coat 13 flows into and through the perforations 11, covering the interior surface thereof and mutually interlocking. The fiber glass layer 12 prior to assembly with the aluminum trough sheet 6 is itself impregnated with a bonding resin jacket 14 to produce a continuous surface and the resin is cured to a gel form.

After the sheets or strips are assembled they are pressed together at an elevated temperature and a film 16 of a sealing resin is applied to the lower surface of the coat 13 on the pre-coated metal sheet 6. Some of this sealing resin film 16 is received through the perforations 11, by the resin impregnation jacket 14 of the fiber glass layer 12. The thus-treated materials are heat cured and a mechanically and chemically interlocked product results.

Sheets of this composite kind can be assembled with identical sheets to form a completed roof covering in the usual fashion and can be handled with the same tools and with the same techniques. They have the advantage of admitting light to the interior and of being substantially as strong and light in most respects as the original sheets and in other respects being even stronger. The materials chosen for the panel and for sealing are preferably such that they have substantially the same coefficient of expansion and hence can take variations in temperature without any differential stresses of substantial amount and without any breaking of the weatherproof seal. Any stresses that do occur, perhaps to settling of the building, windage, or the like, are interchanged between the two main materials because of the adhesion and mechanical interlocks therebetween. The finished panel is in practice of as great strength as the ordinary opaque panel. In addition, the materials utilized are relatively light so that the weight added to the aluminum sheet is not substantially more than the weight of the material removed to provide the openings.

As a convenient manner of fabrication, there can be provided a portable mechanism located at the building erection site, as shown in FIG. 1. In this device an aluminum sheet or long strip 6 is passed through a perforating station 17, represented by punch rolls 18, at which the perforations 11 are provided. Subsequently, the perforated sheet 6 or strip is coated on both sides by a bonding resin coat 13 applied by upper and lower rollers 19 and 21, some of the resin so applied flowing into the perforations 11.

A layer 12 or strip of fiber glass pre-impregnated with a bonding resin jacket 14 in gel form is fed from a roll 22 into the trough of the strip 6 so that both the sheet 6 and the layer 12 are pressed together between rollers 23 and 24. If desired, the rollers 23 and 24 can emboss the layer 12 so that small domes are provided therein generally in registry with the perforations. The roller 23 is preferably supplemented by a roller 26. The rollers 23 and 26 are preferably heated, while the roller 24 acts to apply the coating film 16 of sealing resin from below. The so-treated materials progress through a curing oven 27 and emerge ready for use. Since the fabricating device is set up on the job, the assembled sheets or strips can be cut before or after curing to the precise lengths necessary for the particular job.

What is claimed is:
1. A generally rigid roof light transmitting panel comprising an opaque sheet having perforations therethrough and having a pair of side edges adapted to interengage with similar adjacent sheets, a sealing material coat covering said sheet on both sides thereof and the perforation defining edges, a layer of translucent reinforcing material overlying one side of said sheet and bridging the perforations, a translucent bonding material jacket underlying at least one side of said reinforcing material layer on said one side, and a film overlying the other side of said sheet and extending through said perforations and overlying said bonding material jacket in contact therewith.

2. A device as in claim 1 in which said reinforcing material layer is fiber glass.

3. A device as in claim 1 in which said sealing material coat is a translucent plastic.

4. A device as in claim 1 in which said sealing material coat underlies substantially all parts of said reinforcing material layer and of said sheet.

5. A device as in claim 1 in which said sealing material coat substantially unites said sheet and said reinforcing material layer for stress transmission therebetween.

References Cited
UNITED STATES PATENTS

| | | | |
|---|---|---|---|
| 2,202,988 | 6/1940 | Kennedy | 161—3.5 |
| 2,892,516 | 6/1959 | Kessler | 161—110 |
| 2,984,313 | 5/1961 | Gambill | 161—113 |
| 3,028,277 | 4/1962 | Dunn | 161—409 |
| 3,127,962 | 4/1964 | James | 52—588 |
| 3,341,395 | 9/1967 | Weber | 52—306 |

HENRY C. SUTHERLAND, Primary Examiner

U.S. Cl. X.R.
161—408; 52—309, 588, 307